Patented Oct. 28, 1930

1,779,841

UNITED STATES PATENT OFFICE

OSCAR A. FISCHER, OF DENVER, COLORADO

PROCESS OF SEPARATING METALLIC COMPOUNDS

No Drawing.     Application filed July 13, 1926.  Serial No. 122,275.

My invention relates to a method of separating metals, and one of the objects of the invention is to provide a rapid and efficient method of selectively reducing or decomposing sulphates whereby a maximum amount of oxide or basic sulphate of one element may be produced and a maximum amount of sulphate of another element may be retained. The process is specifically applicable to inorganic sulphates and may be applied to simple mixtures of sulphates or to mixtures of sulphates with oxides or other compounds. It is especially applicable to products of ore or concentrate treatment in which it is desirable to separate the metals existing as sulphates by a cheap and efficient method.

It is known that inorganic sulphates can be decomposed by straight thermal decomposition as shown by the work of Hofman and Wanjukow, reported in the Transactions of the American Institute of Mining Engineers (1912) volume 43, pages 523 to 577, who report the following decomposition temperatures of metallic sulphates:

| Metallic sulphates | Temperature of beginning of decomposition | Temperature of energetic decomposition |
|---|---|---|
| | Degrees C. | Degrees C. |
| $FeSO_4$ | 167 | 480 |
| $Fe_2O_3.2SO_3$ | 492 | 560 |
| $Bi_2(SO_4)_3$ | 570 | 639 |
| $Al_2(SO_4)_3$ | 590 | 639 |
| $PbSO_4$ | 637 | 705 |
| $CuSO_4$ | 653 | 670 |
| $MnSO_4$ | 699 | 790 |
| $ZnSO_4$ | 702 | 720 |
| $2CuO.SO_3$ | 702 | 736 |
| $NiSO_4$ | 702 | 764 |
| $CoSO_4$ | 720 | 770 |
| $3ZnO.2SO_3$ | 755 | 767 |
| $CdSO_4$ | 827 | 846 |
| $5Bi_2O_3.4(SO_3)_3$ | 870 | 890 |
| $5CdO.SO_3$ | 878 | 890 |
| $MgSO_4$ | 890 | 972 |
| $Ag_2SO_4$ | 917 | 925 |
| $6PbO.5SO_3$ | 952 | 962 |
| $CaSO_4$ | 1,200 | |
| $BaSO_4$ | 1,510 | |

However, straight thermal decomposition requires excessively high temperatures and does not permit a regular and satisfactory separation of sulphates, because the vapor pressure of $SO_3$ present tends to prevent decomposition and thus the reaction does not proceed to completion.

I have found that these disadvantages may be obviated by carrying out the separation of metallic sulphates in the presence of a reducing agent, which not only permits lower temperatures to be used, but also gives a regular and satisfactory separation of sulphates because any $SO_3$ that is formed is reduced to $SO_2$. The temperatures that I use should not exceed 800° C., and range preferably from 450° C. to 800° C.

Frequently in the roasting of ore or concentrates some sulphates are formed which are objectionable in the subsequent treatment. It is, therefore, desirable that a means of decomposing these objectionable sulphates without decomposing the other sulphates be provided. For example, in the sulphate roasting of ores containing iron, copper and zinc, it may be desirable to decompose the iron and copper sulphate without breaking up any appreciable amount of the zinc sulphate, thus rendering the iron and copper insoluble in water and providing a means of separating these metals from zinc.

The result is accomplished by roasting the sulphates, or sulphate and compound mixtures in the presence of reducing agents, at temperatures which will selectively and efficiently decompose some of these sulphates and then separate them by subsequent leaching. These reducing agents may be in the solid, or gaseous form, and may be mixed with the sulphates, or passed through or over them. For example, the sulphates can be fed into one end of a rotating heated cylinder and producer gas at the other end, with means for discharging gas and solid at the corresponding opposite ends. Solid reducing agents such as carbonaceous material or sulphides may be mixed with the sulphates and heated, whereby selective breaking up of some of the sulphates is readily accomplished. Liquid reducing agents such as oil are equally effective.

If a mixture of copper, iron and zinc sulphates with ore gangue containing arsenic or antimony, are treated in this manner with temperatures of between approximately 450° C. and 600° C., the calcine resulting will contain but little water soluble copper and iron, while the zinc sulphate remains to a large extent as such. The calcine is then agitated with water, the copper is largely insoluble, though a very small amount may remain soluble. On the other hand, most of the zinc is soluble, as sulphate, with a very small amount converted to zinc oxide. Depending upon the original sulphating roast this zinc oxide, or basic sulphate reacts with the copper sulphate, precipitating the copper and taking the zinc into solution as zinc sulphate.

There are cases also in sulphate roasting of iron and zinc where, in subsequent leaching, some iron is soluble in both water and dilute acid, the amount being too large for efficient treatment. By the use of a reducing atmosphere this amount of soluble iron is reduced to a minimum without affecting the water solubility of the zinc.

This method can also be applied to crystallized sulphate crystals resulting from crystallization of sulphate liquors. These crystals can be selectively reduced to separate various metals.

Reduction of sulphates takes place in the same order as oxidation but at lower temperatures than the decomposition temperatures of metallic sulphates by heat alone. This is accounted for by the fact that in decomposing sulphates by heat alone $SO_3$ is the product, but with sufficient reducing atmosphere present $SO_3$ cannot exist.

It is thus apparent that my method furnishes an effective method of separation of one metal from another metal contained as sulphates in an ore or mixture.

What I claim, is:

1. Process of separating zinc sulphate from a mixture containing copper or iron sulphate comprising heating the mixture in the presence of reducing agents within a temperature range of approximately 450 to 600 degrees C., whereby the copper or iron sulphate is decomposed into insoluble form and the zinc sulphate remains in soluble form.

2. Process of separating zinc sulphate from a mixture containing copper or iron sulphate comprising heating the mixture in the presence of reducing agents within a temperature range not to exceed about 600° C. that will decompose the copper or iron sulphate into insoluble form and the zinc sulphate will remain in soluble form.

3. Process of separating a mixture of metallic sulphates comprising heating the mixture in the presence of reducing agents and at a temperature not to exceed about 800° C. whereby some of the sulphates are rendered insoluble and other sulphates remain soluble.

4. Process of separating metals in ores comprising the formation of metallic sulphates by roasting, selectively reducing by temperature control below 800° C. in the presence of a reducing agent some of the sulphates to an insoluble form in the absence of $SO_3$ in substantial amount while some of the other sulphates remain in unchanged soluble form and then leaching out the soluble sulphates.

5. Process of treating ores to separate zinc from copper or iron comprising roasting the ores to convert the said metals into sulphates, then heating the sulphatized ore in the presence of reducing agents and within a temperature range not to exceed 600° C. which will convert the copper or iron into insoluble form while the zinc remains unchanged as sulphate and then leaching the ore to dissolve out the zinc sulphate.

6. A process of treating sulphide ores which comprises subjecting the ores to a sulphating roast, heating the thus sulphatized ores in the presence of reducing agents while controlling the temperature of the heating within limits not to exceed 800° C. favoring the conversion of selected compounds into substantially insoluble forms while leaving remaining compounds unaltered and thereafter separating the said converted from the said unaltered compounds.

7. A process of treating ores to separate zinc from iron or copper which comprises converting the same to sulphates and heating the sulphates in the presence of reducing agents and within a temperature not to exceed 600° C. which will convert the copper or iron into insoluble form while the zinc remains soluble, and leaching to dissolve the zinc sulphate.

8. A process of treating ores containing a mixture of compounds of zinc and iron or copper which comprises sulphate roasting and reducing the same at a temperature between 450° and 600° C. so that the presence of $SO_3$ is inhibited, whereby the zinc compounds remain soluble and the iron or copper compounds are decomposed into insoluble form.

In testimony whereof, I affix my signature.

OSCAR A. FISCHER.